June 26, 1962
D. A. HARRIS
3,040,920
METHOD AND APPARATUS FOR HANDLING LOADS
Filed Sept. 15, 1958
2 Sheets-Sheet 1
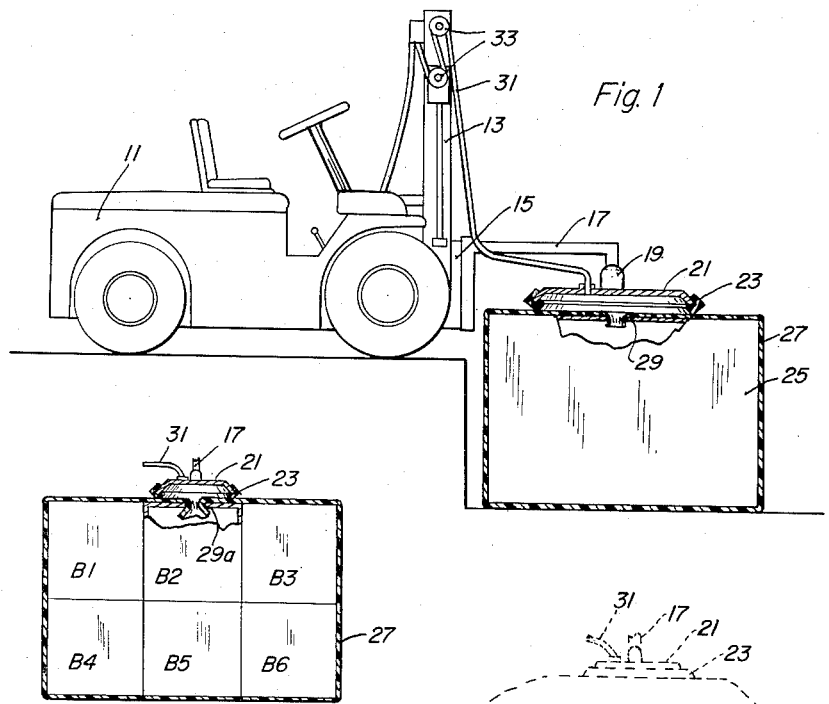
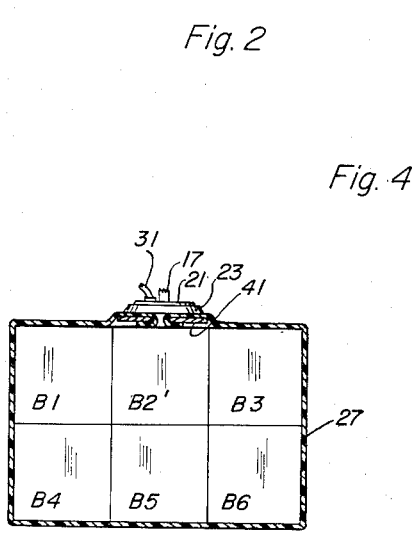
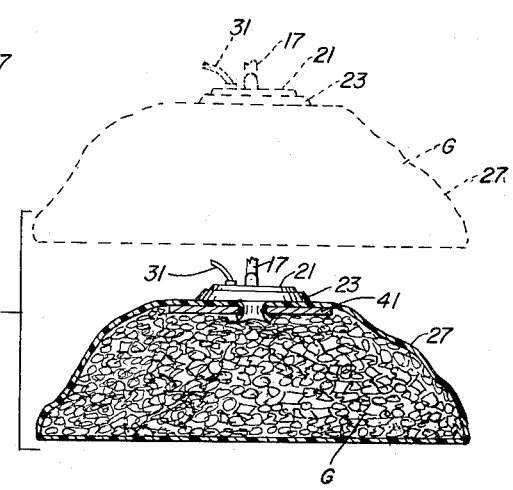
INVENTOR.
Donald A. Harris
BY
Buckhorn, Cheatham & Blore
ATTORNEYS June 26, 1962 D. A. HARRIS 3,040,920
METHOD AND APPARATUS FOR HANDLING LOADS
Filed Sept. 15, 1958 2 Sheets-Sheet 2
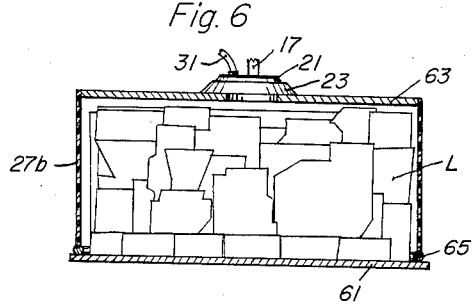
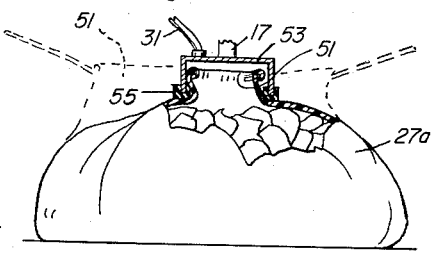
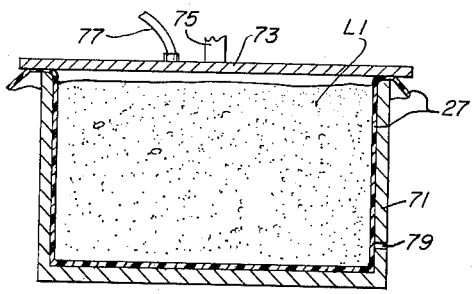
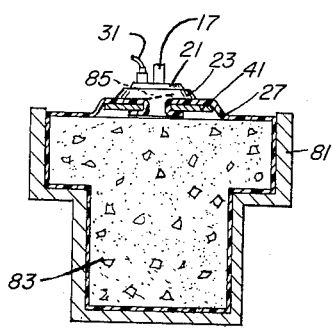
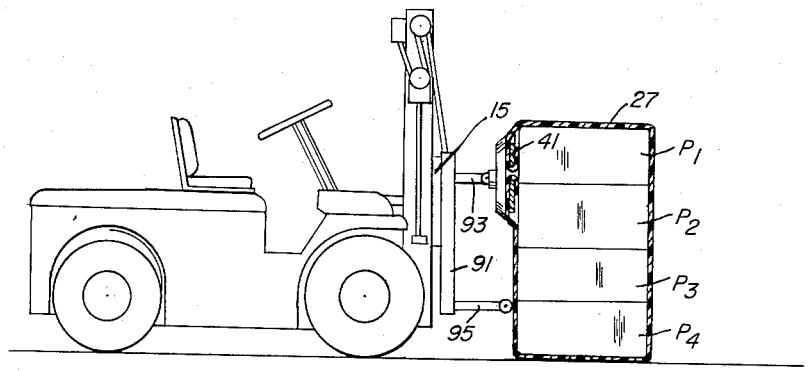
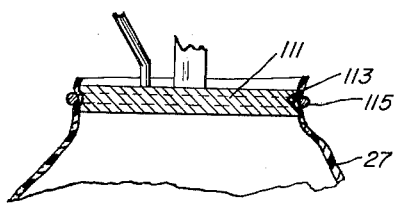
INVENTOR.
Donald A. Harris
BY
Buckhorn, Cheatham & Blore
ATTORNEYS

United States Patent Office 3,040,920
Patented June 26, 1962

3,040,920
METHOD AND APPARATUS FOR
HANDLING LOADS
Donald A. Harris, Vancouver, Wash., assignor to Hyster
Company, Portland, Oreg., a corporation of Nevada
Filed Sept. 15, 1958, Ser. No. 761,218
5 Claims. (Cl. 214—651)

This invention relates to and has for its object the provision of a method and apparatus for handling loads, and particularly for lifting and moving loads.

A main object of the invention is to provide a method and apparatus for handling loads which enables a load to be picked up without the necessity of slipping forks under the load, thereby doing away with the necessity for pallets, and also without the necessity of gripping the load from the opposite side, and thus dispensing with the necessity of complicated clamp mechanisms.

Another object of the invention is to provide a method and apparatus especially adapted for picking up particled loads, that is loads made up of a number of packages or items, without requiring special containers or special clamp or grip mechanisms.

A further object of the invention is to provide a method of picking up a load including the steps of enclosing the load in a sheet of flexible material that is impervious to the passage of air therethrough, creating a partial vacuum within the enclosure defined by the sheet, relieving the load from the differential pressure created at a selected area thereof, and imparting a moving force to the load through such area.

A still further object of the invention is to provide a method as just described in which the sheet is a separate member from the load and may be used over and over again with different loads.

Still another object of the invention is to provide a method and apparatus for picking up a particled load while maintaining the same relationship of the particles to one another after picking up, as before.

Another object of the invention is to provide a method and apparatus for picking up particled loads in which a differential pressure is created to hold the packages or items of the load in clamped relationship with respect to one another, without the use of clamps.

Various other objects of the invention will be apparent from the following description taken in connection with the accompanying drawings wherein:

FIG. 1 is a side view in elevation of an apparatus embodying the concepts of the present invention, certain parts being shown in section;

FIG. 2 is a view showing a particled load being picked up;

FIG. 3 shows an arrangement similar to FIG. 2 but showing a slight modification;

FIG. 4 is a view showing a loose particled load being picked up;

FIG. 5 shows a modified form of apparatus for picking up a loose load;

FIG. 6 shows a still further modified form of the invention;

FIG. 7 shows another modified form of the invention;

FIG. 8 shows a proposed use of the apparatus of the present invention;

FIG. 9 shows a modified form of the invention for picking up a load from the side; and FIG. 10 is a fragmentary vertical section showing a modified connection between a flexible sheet and a suction head.

FIG. 1 shows an apparatus of the invention including an industrial lift truck 11 of conventional form having a mast 13 at its front end along which is movable a load carriage 15. The carriage has a forwardly projecting boom 17 supporting a circular suction head by means of a ball-and-socket joint 19. The suction head includes a plate 21 of metal or other rigid material, the plate having an elastomer depending rim 23.

The load is shown in the form of a single box 25. A sheet of material 27 is wrapped around the box and the edge portions of the sheet are stuffed into an opening 29 formed in the central portion of the top of the box. The sheet of material 27 is flexible and is impervious to the passage of air therethrough. The opening 29 is smaller than the suction head so that the elastomer rim 23 engages the sheet of material in spaced relation to the opening and also in spaced relation to the edges of the sheet.

Air is withdrawn from the interior of the box by means of a suction line 31 which is trained over a slack-take-up mechanism 33 on the mast. The suction line is connected to a suction blower, not shown, which is mounted on the truck, or may be connected to the intake manifold of the engine of the truck.

It is assumed that the walls of the box are not impervious to the passage of air, or that the box walls are joined or connected in a manner to provide cracks or spaces through which air may pass, so that air is not only withdrawn from the interior of the box but also from the space between the box walls and the sheet 27. This creates a differential pressure on the sheet and through the sheet to the load. After the differential pressure is created, the carriage 15 may be elevated to lift the load.

*Theory of Operation*

It was noted during tests that the sheet of material did not bear the weight of the load and in fact was under very little strain other than that imposed upon it by the differential pressure pressing it against the box. It is believed that the rigid suction head plate 21 creates an area at which the differential pressure must act on the box through the plate and its rim. Therefore, if the plate is lifted, a load can be lifted that approximates the area of the plate multiplied by the unit differential pressure. In other words, when the suction head is lifted, the load is lifted by the difference in total pressure acting against the upper surface of the box and the lower surface of the box and not by any pull exerted on the sheet of material.

For convenience in the drawings, the sheet 27 is shown, or appears to be, form fitting. This is not necessary. The sheet may be a plain square or rectangular sheet or a circular sheet with all the edges stuffed into the box hole. The resulting creases do not interfere with the creation of a proper partial vacuum within the box. In one test, a 200 pound box containing gravel was lifted with a very thin sheet of polyethylene film, by employing a vacuum of approximately 19 inches of mercury and a suction head plate diameter of around 7 or 8 inches. These figures are merely illustrative and obviously may vary widely depending upon the load to be lifted, the suction available and similar factors.

FIG. 2 shows a particled load comprising a plurality of boxes arranged in an upper layer of 9 boxes, only 3 of which B1, B2 and B3 are shown, and a lower layer of boxes, only 3, B4, B5 and B6 being shown. The sheet 27 is wrapped around the boxes and stuffed through the central hole 29a in the central box B2. Air is withdrawn from the enclosure defined by the sheet 27 to create a differential pressure and the boxes may be lifted in unison, with no movement relative to one another, by lifting the suction head. The annular member 41 is utilized here to prevent the suction head from pressing too far inwardly into the box B2. If the box is of stiffer material the annular member need not be employed.

*Theory of Operation*

In regard to shifting movement of any one box with relation to the boxes in its layer, it is believed that the differential pressure acting on the boxes presses them together with sufficient force to prevent relative movement. In other words, there is sufficient coefficient of friction between the contacting surfaces of the boxes that the applied force prevents relative movement of the boxes when the boxes are subjected to normal shocks and forces. In fact, it was observed in tests that the boxes could not be shifted relative to one another by merely gripping the boxes with the hand and imparting a shifting force. Why the lower layer of boxes is held tightly against the upper layer is not fully understood, but in the test it was observed that a box B1, for instance, could not be shifted relative to a box B4. Nor could the layer of boxes, including the boxes B1, B2 and B3 be moved upwardly relative to the boxes B4, B5 and B6. Whatever the reasons for the boxes staying together, it was observed that the boxes were lifted as a unit without relative movement just as if two large clamps were clamped on the opposite sides of the layer of boxes.

FIG. 3 shows a slightly modified form of the invention utilizing an annular member 41 but leaving the boxes B1, B2′, B3, B4, B5 and B6 unaltered. In other words, the box B2′ was not provided with a central opening. The marginal portions of the sheet 27 were merely stuffed through the hole in the member 41 and then pressed outwardly to assume a position somewhat similar to that shown in FIG. 3.

In FIG. 4, the sheet 27 was wrapped around a loose load of gravel G and the edges tucked through the hole in the annular member 41 and the suction head placed in the position shown. Withdrawal of air from within the enclosure defined by the sheet of material resulted in a consolidation of the gravel so that the gravel maintained the same shape it had before the application of suction. In other words, there was no movement of the gravel pieces relative to one another, or only very slight movement. When the suction head was elevated, the gravel maintained its form, and did not sag down as might be expected. In the elevated condition, it was noted that the pieces of gravel could not be moved relative to one another even by gripping the pieces of gravel in the hands and applying a shifting force.

FIG. 5 shows a modified form of the invention in which the sheet of material 27a is in the form of a bag having an expandable mouth 51 received within a cup-shaped piece 53 forming a part of the suction head of the apparatus. The cup-shaped piece 53 has a depending, annular elastomer piece 55 for engaging the flexible sheet of material 27 in circular fashion around and in spaced relation to the mouth 51. In this form of the invention the mouth could be expanded to allow the load to be deposited into the bag, and then the expanding force released to allow the mouth to contract. The suction head was then placed over the mouth, a suction created, and the bag lifted assuming the shape and retaining the shape shown in FIG. 5.

FIG. 6 shows a further modified form of the invention in which the load L is placed on a flat piece or panel 61 and the load enclosed by means of a flexible skirt 27b connected at its upper edge to a plate 63 and having at its lower edge a weight means 65. The suction head including the plate 21 and the elastomer bead 23 is permanently connected to the plate 63.

In use, the load L is placed on the flat piece 61 and the skirt is then lowered over the load, with the weight means 65 causing the lower edge of the skirt to rest on the upper face of the flat piece 61. The flat piece 61 has an upper surface which will form a good seal with the lower edge of the sheet or skirt 27b when a partial vacuum is created within the skirt. For instance, a piece of material of the same type as utilized in creating the skirt 27b may be applied to the upper face of the piece 61. It is further pointed out that instead of a flat piece 61, a circular piece of flexible material of the type used in constructing the skirt 27b could be employed. Also, instead of a plate 63, a circular or annular piece of flexible material of the type utilized in making the skirt 27b could be employed. It is therefore immaterial whether the pieces 61 and 63 are of flexible material or whether they are rigid.

In FIG. 7, there is a box 71 having an open top. A sheet of material 27 is placed in the box as a lining with the margins of the sheet overlapping the exposed upper edges of the box. The load, which may be a loose particled load L1 may be then poured or otherwise deposited into the lined box. A suction head including a plate 73, a lifting element 75 and a suction line 77 may be then placed on the box with the lower face of the plate 73 engaging the margins of the sheet 27 overlapping the edges of the box. Suction is then applied which will have the effect of forming a temporary joint between the margins of the sheet 27 and the plate 73 and also have the effect of forcing the load L1 against the plate 73. A lifting force may then be applied through the suction head to lift the load without imposing any of the strain of lifting the load on the joint between the margins of the sheet 27 and the head 73.

In FIG. 8, the sheet 27 is shown as a lining for a concrete form 81 which is filled with wet concrete 83. The sheet has its upper edges tucked through the hole in a plate 41 and a suction head including a plate 21 and an elastomer rim 23 is located as shown. When suction is applied to the head, the withdrawal of air creates a differential pressure against the sheet 27 and through the sheet to the wet concrete. This in a sense consolidates the concrete so that it holds its original form, but at the same time may create a slight space between the exterior surface of the sheet 27 and the form 81 to enable ready withdrawal of the concrete mass and the sheet. Because of the reasons explained in connection with FIG. 4, the concrete mass will retain its form and may be deposited elsewhere and a second concrete mass poured into a second liner in the form. Thus only one form need be employed for making a plurality of objects. A flap valve 85 holds the vacuum.

It is believed that any particled material may be handled in the fashion of the concrete in FIG. 8 or the gravel in FIG. 4 so long as the differential pressure applied against the material does not cause it to extrude into the suction head and the suction line.

FIG. 9 shows a modified form of the invention in which the carriage 15 has a mounting plate 91 which is provided with a forwardly projecting arm 93 carrying a suction head of the type disclosed in FIG. 1. The load which may comprise a plurality of stacked packages P1, P2, P3 and P4 is enclosed within a sheet 27 and the edges of the sheet tucked through the opening in an annular plate 41 before the suction head is applied over the opening thus formed. A heeling bar 95 is provided on the lower end of the member 91 against which the load may bear. The application of suction creates a force of sufficient magnitude between the suction head and the sheet 27 to enable the load to be picked up.

FIG. 10 shows a modified form of suction head including a disk 111 formed with a groove 113 within which the edges of the sheet 27 may be clamped by a string 115 or a split clamp or any other suitable means. It may be desirable to specially form the sheet 27 so that it has a tapering neck to more readily fit the disk 111. When the differential pressure is created, there is a temporary joint formed between the disk 111 and the sheet 27 which is sufficient to hold the vacuum. That is all that is required in order to lift the load. The type of head shown in FIG. 10 may be utilized instead of the type of head shown in FIG. 1 or FIG. 3. Thus the form of the invention shown in FIG. 10 does not require an annular plate 41.

In the claims, the term cover is meant to be broad enough to cover a one piece covering or a covering consisting of several or more pieces. For instance, the patent to Cushman 2,709,519 discloses a two-piece flexible covering.

Having described the invention in what is considered to be the preferred embodiment thereof, it is desired that it be understood that the invention is not to be limited other than by the provisions of the following claims.

I claim:

1. The method of moving a load comprising enclosing said load within a flexible cover that is impervious to air and has insufficient strength to support the load, providing an opening in said cover, removing air from the cover through said opening to place the interior of the cover at a pressure less than the ambient pressure to apply a gas pressure force against the exterior of such cover and through such cover to said load, providing next to such load an area that includes said opening and that is relieved of the gas pressure force and is of a size such that the differential pressure acting thereon creates a force greater than the weight of the load, and exerting a load moving force on the enclosed load.

2. The method of moving a particled load comprising enclosing such particled load in a flexible cover that is at least substantially impervious to air and has insufficient strength to support the load, providing an opening in said cover, removing air from the cover through said opening to create a pressure within such cover that is less than the pressure of the ambient air to thereby apply an air pressure force against the exterior of said cover and through the cover to such particled load to consolidate the particled load by forcing the particles against one another so that they resist relative movement, providing next to such load an area that includes said opening and that is relieved of the gas pressure force and is of such a size that the differential pressure acting thereon creates a force greater than the weight of the load and cover, and exerting a load moving force on such consolidated particled load at such area.

3. Apparatus for lifting a load comprising a base member providing a surface which is impervious to air and on which a load to be lifted is placed, a hoodlike cover member constituting a separate entity from said base member for enclosing the load with the lower margins of the cover member in contact with the base member, said lower margins forming a seal with said base member when a subatmospheric pressure is created within said cover, said cover member having an essentially inflexible portion spaced from said base member and also flexible portions to engage said base member and to facilitate forcing said load against said inflexible portion, means for connecting said cover member with a source of vacuum to create a subatmospheric pressure within said cover to force said load against said inflexible portion, and means for connecting said inflexible portion to a source of movement to facilitate movement thereof and thereby movement of said load with the imposition of a separating force on said margin seal of only a small fraction of the weight of the load.

4. The method of handling a load comprising a plurality of items, said method comprising completely enclosing said items in a flexible cover that is at least substantially impervious to air and is of insufficient strength to support said load, providing an opening in said cover, causing relative approaching movement between a suction device and said covered load in a manner to locate said device in contact with said cover and over said opening, consolidating said load by drawing air from within said cover through said suction device, moving said covered load by moving said suction device, supplying air to said suction device to release said device from said covered load, and causing relative separating movement between said suction device and said covered load to separate said device from said covered load.

5. The method of handling a load comprising completely enclosing said load in a flexible cover that is at least substantially impervious to air, providing an opening in said cover, causing relative approaching movement between a suction head and said covered load in a manner to locate said head in contact with said cover and over said opening, drawing air from within said cover and through said suction head, moving said covered load by moving said suction head while maintaining the subatmospheric pressure at said suction head and maintaining communication between said head and the interior of said cover at all times while moving the load so as to maintain a subatmospheric pressure within said cover, supplying air to said suction head to release said head from said covered load, and causing relative separating movement between said head and said covered load to separate said head from said load.

References Cited in the file of this patent

UNITED STATES PATENTS

| | | |
|---|---|---|
| 2,681,757 | Kellersman | June 22, 1954 |
| 2,709,519 | Cushman | May 31, 1955 |
| 2,716,487 | Wahl et al. | Aug. 30, 1955 |
| 2,893,581 | Cushman | July 7, 1959 |
| 2,920,916 | Pagdin | Jan. 12, 1960 |